Aug. 21, 1951     F. WEIDMAN ET AL     2,565,333

MASONRY DRILL

Filed Oct. 25, 1947

INVENTOR.
Fred Weidman
BY Earl M. Pierce

ATTORNEYS

Patented Aug. 21, 1951

2,565,333

UNITED STATES PATENT OFFICE 2,565,333

MASONRY DRILL

Fred Weidman and Earl M. Pierce, Cuyahoga Falls, Ohio, assignors to Carboloy Company, Inc., a corporation of New York Application October 25, 1947, Serial No. 782,134

7 Claims. (Cl. 255—61)

This invention relates to an improvement in masonry drills and more particularly, to an improvement in masonry drills of the type embodying a non-fluted cylindrical steel shank having a hard, wear-resistant cutting member brazed into the slotted end portion of the shank. Drills of this type are well known to the art and have found widespread application in drilling shallow holes up to about 1 to 1½ inches in depth in concrete, slate, tile, bricks and other similar materials. In drilling holes deeper than about 1 to 1½ inches, however, much difficulty has been encountered because of the tendency of the grindings to remain in the hole and to pack around the cutting member, causing the drill to bind, generate heat, and to lose its drilling efficiency.

It is one of the objects of this invention to provide a masonry drill which is highly satisfactory for deep hole drilling in concrete, slate, bricks, tile and other similar materials.

It is a further object of this invention to provide a deep hole masonry drill which is simple in construction, easy to manufacture and relatively cheap.

Other objects and advantages of our invention will appear hereinafter.

Figure 1:
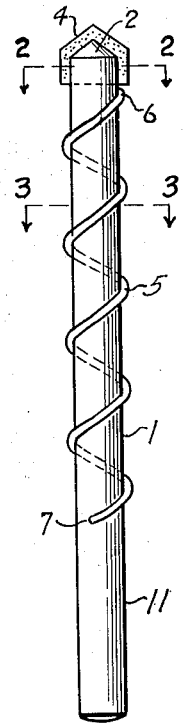
Fig. 1 is an elevation of our improved drill.
Figure 2:
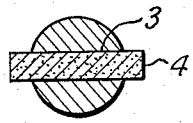
Fig. 2 is a section along the line 2—2 of Fig. 1.

More particularly, in Fig. 1, our drill consists of a steel shank member 1, having a conical end section 2 which is slotted as at 3 to receive the hard, wear-resistant cutting member 4. The cutting member 4, may be selected from any of the known cemented hard metal carbides, such as tungsten carbide (WC), titanium carbide (TiC), tantalum carbide (TaC), or mixtures thereof together with a binder selected from the iron group, which are made by any of the well known processes, e. g., such as that taught in the patent to Schroter Re. 17,624. The cutting member 4 is normally attached to the shank member 1 by brazing with copper or with silver base alloys. The shank member 1 with the cutting member 4 brazed into place constitutes the present day masonry drill.

Our improvement comprises a helical spring member 5, wrapped around the shank member 1, and preferably attached at its extremities 6, 7 to the shank member 1 by spot welding, brazing with copper or silver base alloys or by other suitable means. We have found that these attachments are most advantageously made by preforming in the shank member 1 at each point of attachment of spring 5, a slight recess which allows the resulting joint to be dressed off to make the juncture less susceptible to wear from contact with the side walls of the hole. The spring member 5 may be selected from any of the commercial spring materials such as, e. g., music wire, armature banding wire or other high carbon spring steels, and it may be of various cross sectional shapes, including round, square, and rectangular, or hollow tubing in round, square and rectangular shapes. The spring member preferably extends from the cutting end of the drill to a point adjacent the chuck engaging portion 11 of the drill shank 1. The spring member 5 is preferably attached to the shank member 1 only at its ends but in drilling holes deeper than approximately six inches with a drill having a spring member 5 longer than six inches, it sometimes becomes necessary to attach the spring member to the shank approximately half way between the ends. The spring member 5 should be made with a left-handed spiral so that with clockwise rotation of the drill, the grindings will be given an upward thrust. The inside diameter of the spring helix 5 should be approximately .002 inch to .025 inch greater than the outside diameter of the shank member 1. The pitch of the spring member varies with the material being drilled and with the size of the drill being used, e. g., when drilling slate with a one-half inch diameter drill, a satisfactory pitch is one-half inch to seven-eighths inch; in drilling concrete the most effective pitch was approximately three inches when using a one-half inch diameter drill. Coarse grinding requires a drill having a longer pitch than fine grinding, with the particular application determining the pitch to be used.

Figure 5:
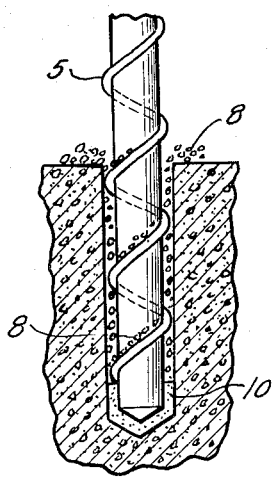
Fig. 5 is an illustrative showing of our drill in operation.

While the purpose of the spring member 5 is to remove the grindings from the hole, we have found that the action of the spring in accomplishing the removal is somewhat different than the action of a conventional fluted shank. The ejection action is dependent upon the spring properties of member 5. As the drill goes down and the grindings (illustrated at 8, Fig. 5) begin to accumulate, they are pushed in between the coils or turns of the spring by the near contact with the side walls of the hole causing the spring coils or turns to advance inwardly of the hole or toward the cutting end of the drill, owing to the resistance of the grindings to the expelling action of the helical coil spring, until finally the spring tension overcomes this resistance and the helical spring suddenly contracts axially and expels the grindings. In other words, the resistance of the cuttings to the expelling action of the spring tends to decrease the normal pitch of the coils or turns of the spring located within the hole being bored and which are engaged in the ejecting of the grindings from the cutting end of the drill until the tension of the spring coils or turns or their tendency to return to their normal position or pitch overcomes the resistance of the particles thereby causing the spring to suddenly resume its normal pitch and thus convey the grindings along the hole or shank of the drill and expel the grindings from the hole with what might be termed a vibratory or intermittent ejection action. Of course, when the coils of the spring within the hole decrease their pitch or contract, then the coils without the hole tend to elongate or increase their pitch because the spring 5 is anchored to the shank at each end. Repetitive actions of this type keep the grindings continually removed. The contraction and expansion of the spring member 5 is not of large amplitude but rather a movement in the range of about 1/32 inch to about 1/8 inch longitudinally along shank member 1. There is also some normal upward travel of the grindings along the coils of the spring member, but much of the efficient operation of the drill is dependent upon this phenomenon of spring action.

The cross-sectional dimension of the spring member 5 should be selected so that the cutting member 4 will be greater in diameter than the shank member 1 with the spring member 5 attached, that is, the diameter of cutting member 4 should be greater than the diameter of shank 1 plus twice the diameter of the wire from which helix 5 is formed. This permits a slight clearance between the helical coil 5 and the wall of the hole being drilled. We have found that the drill will operate satisfactorily when the diameter of the cutting member 4 is greater by about .010 inch, but that wear on the spring member 5 from contact with the wall of the hole being drilled may be reduced by maintaining this difference in diameter between about 1/64 to about 3/64 of an inch.

Figure 4:
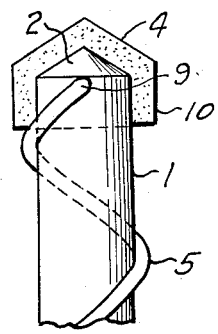
Fig. 4 is a fragmentary perspective view showing a modified form of our improved drill.
Figure 3:
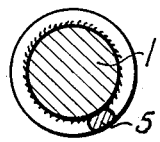
Fig. 3 is a section along the line 3—3 of Fig. 1.

In Fig. 4 we have shown a modified form of improved drill which differs from the principal form shown in Fig. 1 only in that helical spring 5 has its one end 9 welded or otherwise affixed to the shank 1 adjacent the conical end 2 of drill 1. Thus, the coil spring 5 overlaps the cutting edges 10 of the hard metal cemented carbide tip 4 whereas in the principal form, Fig. 1, the one end of spring 5 terminated substantially at the cutting tip 4.

Our improved drill is easily manufactured and adds relatively little to the cost of the finished drill while it extends the field of usefulness of the present day masonry drills by an incalculable amount.

We claim:

1. A drill for masonry and the like comprising a shank having a cutting edge at one end and a helical coil of spring wire mounted loosely over said shank with the turns of said coil capable of axial movement along said shank between the ends of the coil to change the normal pitch of the turns of the helical coil, said helical coil extending from a point adjacent the cutting end of the shank toward the opposite end of the shank and having its opposite ends fixed to the shank whereby the turns of the helical coil are free to expand and contract as the coil ejects the cuttings from the hole being drilled.

2. A drill for masonry and the like comprising a shank having a cutting edge at one end and a helical coil of spring wire mounted loosely over said shank, said helical coil extending from a point adjacent the cutting end of the shank toward the opposite end of the shank, said coil spring being fixed at at least one point to the shank and the normal inside diameter of the helical coil being greater than the outside diameter of the shank whereby the turns of the helical coil are free to expand and contract repetitively while the drill is in operation to eject the cuttings from the hole being drilled.

3. A drill for drilling masonry and the like comprising a shank, a hard metal carbide tip at one end of the shank, said hard metal carbide tip having a diameter greater than the diameter of the shank, a helical coil of spring wire positioned loosely over said shank and extending axially along the shank from the cutting tip toward the other end of the shank, the said coil having a clearance with the shank in an amount falling within a range of from about .002 inch to .025 inch.

4. The combination as set forth in claim 3 wherein the coil spring is fixed to the shank at at least one place.

5. The combination as set forth in claim 3 wherein the opposite ends of the coil are affixed to the shank whereby the turns of the spring coil between its points of fixation to the shank are free to expand and contract axially of the shank.

6. A drill for drilling masonry and the like comprising a shank, a cutter fixed to one end of the shank and centered with respect to the longitudinal axis of said shank, said cutter being wider than the shank along one diameter of the shank and narrower than the shank along another diameter of the shank whereby the grindings or cuttings are free to pass from the cutter toward and along the shank, a helical coil of spring wire loosely wrapped around said shank and extending axially along the shank from the cutting end toward the other end of the shank, said helical spring being capable of axial elongation and contraction to change the normal pitch of the turns of the helical spring whereby said coil spring ejects the cuttings from the hole being drilled.

7. The drill claimed in claim 6 wherein the inside diameter of the helical coil is greater than the outside diameter of the shank by an amount falling within a range of from about .002 inch to .025 inch.

FRED WEIDMAN.
EARL M. PIERCE.

REFERENCES CITED

The following references are of record in the file of this patent:

UNITED STATES PATENTS

| Number | Name | Date |
| --- | --- | --- |
| Re. 17,624 | Schroter | Mar. 18, 1930 |
| 220,572 | Burgess | Oct. 14, 1879 |
| 293,271 | Philips et al. | Feb. 12, 1884 |
| 675,720 | Deemer | June 4, 1901 |
| 2,425,132 | Stokes | Aug. 5, 1947 |

FOREIGN PATENTS

| Number | Country | Date |
| --- | --- | --- |
| 375,596 | Great Britain | June 30, 1932 |